United States Patent
Du et al.

(10) Patent No.: US 11,777,824 B2
(45) Date of Patent: Oct. 3, 2023

(54) ANOMALY DETECTION METHOD AND APPARATUS

(71) Applicant: ZTE CORPORATION, Guangdong (CN)

(72) Inventors: Yongsheng Du, Guangdong (CN); Yingyan Luo, Guangdong (CN); Chunjin Pan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 31 days.

(21) Appl. No.: 17/625,078

(22) PCT Filed: May 19, 2020

(86) PCT No.: PCT/CN2020/090936
§ 371 (c)(1),
(2) Date: Jan. 5, 2022

(87) PCT Pub. No.: WO2021/004161
PCT Pub. Date: Jan. 14, 2021

(65) Prior Publication Data
US 2022/0278914 A1    Sep. 1, 2022

(30) Foreign Application Priority Data
Jul. 5, 2019   (CN) .......................... 201910605053.9

(51) Int. Cl.
*H04L 43/0817* (2022.01)
*G06F 18/214* (2023.01)
(Continued)

(52) U.S. Cl.
CPC ........ *H04L 43/0817* (2013.01); *G06F 18/214* (2023.01); *G06F 18/2178* (2023.01); *H04L 63/1425* (2013.01)

(58) Field of Classification Search
None
See application file for complete search history.

(56) References Cited

U.S. PATENT DOCUMENTS

2003/0004679 A1* 1/2003 Tryon, III ........... H04L 41/5032
                                                          702/182
2016/0103838 A1* 4/2016 Sainani ............... H04L 41/5045
                                                          707/725
(Continued)

FOREIGN PATENT DOCUMENTS

CN          1996888 A      7/2007
CN        105471854 A      4/2016
(Continued)

OTHER PUBLICATIONS

ZTE Corporation, International Search Report with English Translation, PCT/CN2020/090936, dated Jul. 29, 2020, 6 pgs.
(Continued)

*Primary Examiner* — Anh Nguyen
(74) *Attorney, Agent, or Firm* — Dority & Manning, P.A.

(57) ABSTRACT

Disclosed in embodiments of the present disclosure are an anomaly detection method and apparatus. The method includes: detecting first feature data of collected first data using each anomaly detection algorithm, respectively, where N is an integer greater than or equal to 1; in response to first detection results corresponding to one or more anomaly detection algorithms being abnormal, performing reliability verification on the first feature data of the first data to obtain first verification results; and determining second detection results according to the first verification results and according to whether reliability of the one or more anomaly detection algorithms is greater than or equal to a first preset threshold.

17 Claims, 1 Drawing Sheet

(51) Int. Cl.
*G06F 18/21* (2023.01)
*H04L 9/40* (2022.01)

(56) References Cited

U.S. PATENT DOCUMENTS

2017/0034721 A1 2/2017 Yang et al.
2018/0292806 A1 10/2018 Kawatake
2019/0081969 A1 3/2019 Phadke et al.

FOREIGN PATENT DOCUMENTS

| CN | 105630885 A | 6/2016 |
| CN | 106357622 A | 1/2017 |
| CN | 107276851 A | 10/2017 |
| CN | 108322347 A | 7/2018 |
| CN | 108762993 A | 11/2018 |

OTHER PUBLICATIONS

ZTE Corporation, Extended European Search Report, EP 20837813.3, dated Jul. 1, 2022, 9 pgs.

\* cited by examiner

ANOMALY DETECTION METHOD AND APPARATUS

CROSS REFERENCE TO RELATED APPLICATIONS

The present application is a United States National Stage Application filed under 35 U.S.C. § 371 of PCT Patent Application Serial No. PCT/CN2020/090936, filed on May 19, 2020, which claims priority to Chinese Patent Application No. 201910605053.9, filed on Jul. 5, 2019, each of which is incorporated by reference herein in its entirety.

TECHNICAL FIELD

The embodiments of the present disclosure relate to, but are not limited to, the field of communication operation and maintenance, in particular to an anomaly detection method and apparatus.

BACKGROUND

In the field of communication operation and maintenance, some key performance indexes (KPIs) of telecom operation services are detected, such as a radio switch-on rate, a packet loss rate, a current number of users, an uplink and downlink traffic and the like. In response to there being an anomaly (or deterioration) in the KPI, it is likely to be caused by a change in the communication environment or a failure of hardware or software, etc. Timely finding out and solving of problems by operation and maintenance personnel can effectively improve user satisfaction and maintain the company's reputation. However, the number of KPIs in the communication network is huge, and there are thousands of types. At the same time, the upcoming 5G communication technology will multiply the number of KPIs, making it more and more difficult to rely on operation and maintenance personnel to manually monitor and maintain the KPI data of the entire network in real time. Therefore, the intellectualization of anomaly detection and maintenance on the KPIs of the communication network is becoming more and more urgent.

Most of the related intelligent anomaly detection systems are based on machine learning technology. For the field of communication operation and maintenance, it is basically difficult to accumulate enough annotated samples to obtain, by training, a reliable model for detection at the initial stage of introducing machine learning. The reason is that the annotation cost is high, that is, there are a large number of KPIs. At the same time, the threshold of manual annotation is high, which requires a lot of professional knowledge. However, it is difficult to guarantee the reliability of detection results by relying on an unsupervised learning algorithm or training on a supervised learning algorithm with a small number of samples.

SUMMARY

Some embodiments of the present disclosure provide an anomaly detection method, which includes: detecting first feature data of collected first data using N anomaly detection algorithms to obtain first detection results corresponding, respectively, to the N anomaly detection algorithms, where N is an integer greater than or equal to 1; in response to first detection results corresponding to one or more anomaly detection algorithms being abnormal, performing reliability verification on the first feature data of the collected first data to obtain first verification results; and determining second detection results according to the first verification results and according to whether reliability of the one or more anomaly detection algorithms is greater than or equal to a first preset threshold.

Some embodiments of the present disclosure provide an anomaly detection apparatus, which includes a processor and a computer-readable storage medium in which instructions are stored. The instructions, in response to being executed by the processor, implement any one of the above-described anomaly detection methods.

Some embodiments of the present disclosure provide a computer-readable storage medium, on which a computer program is stored. The computer program, in response to being executed by a processor, performs the operations of any one of the above-described anomaly detection methods.

Some embodiments of the present disclosure provide an anomaly detection apparatus, which includes a detection module, configured to detect first feature data of collected first data using N anomaly detection algorithms to obtain first detection results corresponding, respectively, to the N anomaly detection algorithms, where N is an integer greater than or equal to 1; and in response to first detection results corresponding to one or more anomaly detection algorithms being abnormal, perform reliability verification on the first feature data of the collected first data to obtain first verification results; and a determining module, configured to determine second detection results according to the first verification results and according to whether reliability of the one or more anomaly detection algorithms is greater than or equal to a first preset threshold.

Other features and advantages of the embodiments of the present disclosure will be described in the following description, and partly become obvious from the description, or are understood by implementing the embodiments of the present disclosure. The purpose and other advantages of the embodiments of the present disclosure may be realized and obtained through a structure specifically pointed out in the description, claims and drawings.

BRIEF DESCRIPTION OF THE DRAWINGS

The accompanying drawings are used to provide a further understanding of the technical scheme of the embodiments of the present disclosure, and constitute a part of the description. Together with the embodiments of the present disclosure, they are used to explain the technical scheme of the embodiments of the present disclosure, and do not constitute a limitation to the technical scheme of the embodiments of the present disclosure.

DETAILED DESCRIPTION

The embodiments of the present disclosure may be described in detail below with reference to the accompanying drawings. It should be noted that the embodiments in the present disclosure and the features in the embodiments may be combined with each other at random, in the case of no conflict.

The operations shown in the flowcharts of the accompanying drawings may be executed in a computer system, including such as a set of computer-executable instructions.

Although a logical order is shown in the flowcharts, in some cases, the operations shown or described may be executed in a different order than here.

Figure 1:
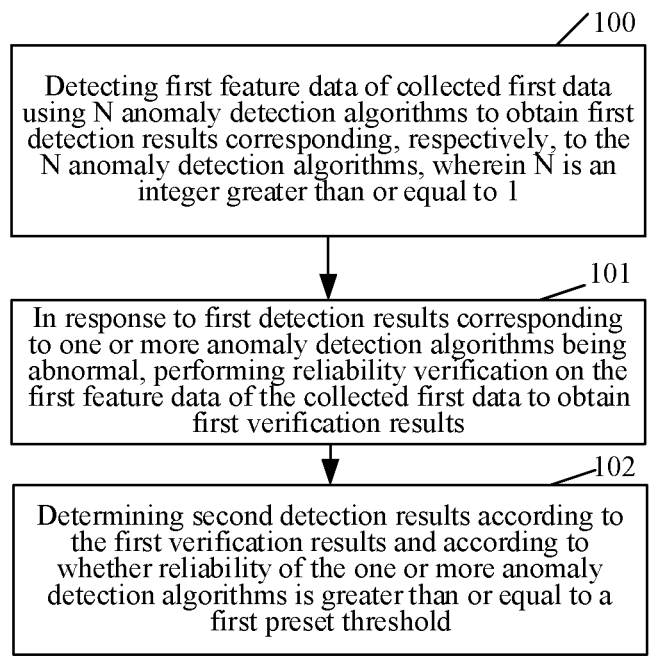
FIG. 1 is a flowchart of an anomaly detection method according to an embodiment of the present disclosure.

Referring to FIG. 1, an embodiment of the present disclosure provides an anomaly detection method, which includes the following operations. In operation 100, first feature data of collected first data is detected using N anomaly detection algorithms to obtain first detection results corresponding, respectively, to the N anomaly detection algorithms, where N is an integer greater than or equal to 1.

In the embodiments of the present disclosure, the first data may be any data requiring an anomaly detection, such as KPI data.

For example, for an index of radio resource control (RRC) connection establishment success rate of a cell 1, the first data includes a time series number data1 and related data data2.

Herein, the data1 is denoted as $\{(t_1, x_1), \ldots, (t_w, x_w)\}$, where $t_w$ is a time to perform detection, $x_w$ is a value of a RRC connection establishment success rate corresponding to $t_w$, and a granularity of sampling time is T, that is, $t_w - t_{w-1} = T$. The data2 is denoted as $[x_{eff}, x_{ref}, \text{pre\_res}, \text{obj\_id}, \text{KPI\_id}]$, where $x_{eff}$ is the number of RRC connection establishment requests corresponding to $t_w$, $x_{ref}$ is the number of RRC connection establishment failures, pre_res represents whether there is anomaly at $t_{w-1}$, obj_id is an id of the cell, and KPI_id is an id of a KPI to be detected.

In the embodiments of the present disclosure, after collecting the first data, all the first feature data required by the N anomaly detection algorithms may be extracted from the first data at one time. Before detecting the first feature data of the collected first data using each of the anomaly detection algorithms to obtain the first detection result, first feature data required by the current anomaly detection algorithm is selected from the extracted feature data.

Alternatively, before detecting the first feature data of the collected first data using each of the anomaly detection algorithms to obtain the first detection result, the first feature data required by the current anomaly detection algorithm is extracted from the collected first data.

It is certain that not all the first data requires a feature extraction. The first data requiring no feature extraction may be directly used as the first feature data.

In an exemplary example, before extracting the feature data of the first data, the first data is cleaned first, and then the feature data is extracted from the cleaned first data. It is certain that not all the first data require to be cleaned, but some of the first data may be cleaned, which is not limited in the embodiment of the present disclosure.

For example, for the forgoing data1 and data2, the data1 is cleaned, but the data2 is not cleaned. For example, in response to the data1 having a missing value, methods such as a linear interpolation and a mean value are used to supplement in the missing data.

After cleaning the data1, the first feature data is extracted from cleaned data1. For example, feature statistics (such as a maximum value $x_{max}$, a minimum value $x_{min}$, an average value $x_{mean}$, a median value $x_{median}$, a standard deviation $x_{std}$, etc.), a periodic judgment, a classification feature construction (such as an one-hot coding of $t_w$, including hour, day of the week, etc.), calculation of a year-on-year ratio and month-on-month ratio of $x_w$, of a first-order difference, of a second-order difference and the like are carried out on the cleaned data1.

The data2 is added directly into the first feature data to obtain the final first feature data, which is denoted as feature data=$[f_1, f_2, \ldots, f_n]$.

In the embodiments of the present disclosure, the anomaly detection algorithms may be a statistical-based learning algorithm (such as a 3-sigma, an exponentially weighted moving-average (EWMA), an autoregressive integrated moving average model (ARIMA), etc.), an unsupervised classification algorithm (such as an isolation forest, an one-class support vector machine (SVM), a variational auto-encode, etc.), and a supervised learning algorithm (such as a logical regression, an extreme gradient boosting (XG-Boost), a deep neural network (DNN), etc.). In this embodiment, multiple anomaly detection algorithms are used for anomaly detection, with the aim of detecting all possible abnormal data. For example, for the first feature data extracted from the data1 and the data2 mentioned above, the first detection results obtained by using 3-sigma, EWMA, Holt-Winters and XGBoost algorithms are res1=1, res2=0, res3=0 and res4=1, respectively, where 0 means normal and 1 means abnormal.

In operation 101, in response to first detection results corresponding to one or more anomaly detection algorithms being abnormal, reliability verification is performed on the first feature data of the first data to obtain first verification results.

In the embodiments of the present disclosure, the user may set a verification condition of the reliability verification, select a reliability evaluation method and set related parameters through an interface, and may also import the verification condition, the reliability evaluation method and the related parameters by writing a configuration file. The specific implementation is not limited in the embodiments of the present disclosure.

In an exemplary example, performing the reliability verification on the first feature data of the first data includes: performing at least one of the following on the first feature data of the first data: a data validity check, a safety interval check, a network-wide contribution check, an anomaly persistence check.

The specific rules for performing the reliability verification are given by experts according to service experience and domain knowledge, which may be set by users on a page or imported by a configurable file.

For example, for the first feature data extracted from the data1 and the data2, performing the data validity check on the first feature data is to detect whether the number of RRC connection establishment requests $x_{eff}$ is greater than a second preset threshold $x_{eff}\_threshold$. In response to the number of RRC connection establishment requests being greater than the second preset threshold, the first data is considered to be valid, and the safety interval check is continued on the first feature data. In response to the number of RRC connection establishment requests being less than or equal to the second preset threshold value, the first data is considered to be invalid, then the first data is normal (that is, the first verification results are normal), and the check ends. Herein, $x_{eff}\_threshold$ is given by experts according to service experience and domain knowledge, which may be specifically set by users on the page or imported by the configurable file.

Performing the safety interval check on the first feature data is to detect whether the RRC connection establishment success rate $x_w$ is within a safety interval $[x_{min}, x_{max}]$. In response to the RRC connection establishment success rate being within the safety interval, the first data is considered to be normal (that is, the first verification results are normal), and the check ends. In response to the RRC connection establishment success rate being not within the safety interval, the network-wide contribution check is continued on the first feature data. Herein, the safety interval [$x_{min}$, $x_{max}$ x] is given by experts according to service experience and domain knowledge, which may be specifically set by users on the page or imported by the configurable file.

Performing the network-wide contribution check on the first feature data is to detect whether the number of RRC connection establishment failures $x_{ref}$ is greater than a third preset threshold $x_{ref\_}$threshold. In response to the number of RRC connection establishment failures are greater than the third preset threshold, the first verification results are determined to be abnormal. In response to the number of RRC connection establishment failures are less than or equal to the third preset threshold, the persistence check is continued on the first feature data. Herein, $x_{ref\_}$threshold is given by experts according to service experience and domain knowledge, which may be specifically set by users on the page or imported by the configurable file.

Performing the persistence check on the first feature data is to detect whether check results pre_res in a period before $t_w$ are abnormal, and whether there is a trend of continuous deterioration by determining according to a value of the second-order difference. In response to the check results in the period before $t_w$ being abnormal and there being the trend of deterioration, the first verification results are determined to be abnormal. In response to at least one of the check results in the period before $t_w$ being normal, or there being a trend of improvement, the first verification results are determined to be normal, and the check ends.

In operation 102, second detection results are determined according to the first verification results and according to whether reliability of the one or more anomaly detection algorithms is greater than or equal to a first preset threshold.

In an exemplary example, determining the second detection results according to the first verification results and according to whether the reliability of the one or more anomaly detection algorithms to which the first detection results being abnormal correspond is greater than or equal to the first preset threshold includes one or more of the following: in response to the reliability of at least one of the one or more anomaly detection algorithms being greater than or equal to the first preset threshold, determining that the second detection results are abnormal; and in response to the reliability of each of the one or more anomaly detection algorithms being less than the first preset threshold, taking the first verification results as the second detection results.

For example, in the above detection of the first feature data extracted from the data1 and the data2, in response to the reliability of the anomaly detection algorithm XGBoost being greater than or equal to the first preset threshold and the reliability of the anomaly detection algorithm 3-sigma is less than the first preset threshold, the second detection results are determined to be abnormal. In response to the reliabilities of the anomaly detection algorithms XGBoost and 3-sigma are less than the first preset threshold, the first verification results are taken as the second detection results.

In an exemplary example, the reliabilities of the anomaly detection algorithms includes: a similarity comparison of the anomaly detection algorithms, a statistical check, etc. For example, a coincidence rate of the anomaly detection algorithms.

In another exemplary example, before determining the second detection results according to the first verification results and according to whether the reliability of the one or more anomaly detection algorithms is greater than or equal to the first preset threshold, the method further includes: calculating the coincidence rate of each of the anomaly detection algorithms.

In an exemplary example, calculating the coincidence rate of each of the anomaly detection algorithms includes: determining a ratio of a first quantity to a second quantity as the coincidence rate; where, the first quantity is a number of pieces of second data, among all second data collected within a preset time, to which third detection results being identical to second verification results corresponds, herein the third detection results are obtained by detecting second feature data of the all second data using each of the anomaly detection algorithms, and the second verification results are obtained by performing reliability verification on the second feature data of the all second data; and the second quantity is a number of pieces of second data, among the all second data collected within the preset time, to which third detection results being abnormal corresponds, herein the third detection results being abnormal are obtained by detecting the second feature data of the all second data using each of the anomaly detection algorithms.

Taking the detection results of the index of RRC connection establishment success rate for all cells in the last month as an example. That is, assuming that there are m samples, among all samples of the index of the RRC connection establishment success rate for all cells in the past month, to which the detection results obtained by using the anomaly detection algorithms correspond are abnormal, and the detection results corresponding to each sample obtained by each anomaly detection algorithm and the verification results obtained by the reliability verification of the collected data are recorded. Based on this, the number of samples $c_i$ to which the detection results of anomaly detection algorithm i being consistent with the verification results correspond is calculated, and the coincidence rate is $c_i/m$.

In another embodiment of the present disclosure, the method further includes one or more of the following: in response to the second detection results being abnormal and anomaly cancellation information from a user having been received, annotating the first data as a normal sample and adding the first data into an annotated sample library; and in response to the second detection results being abnormal and anomaly confirmation information from the user having been received, annotating the collected first data as an abnormal sample and adding the first data to the annotated sample library; where, samples annotated as normal or abnormal in the annotated sample library are configured for training supervised learning models of the anomaly detection algorithms, and the anomaly detection algorithms are configured to detect the first feature data of the first data based on the supervised learning models to obtain the first detection results corresponding, respectively, to the N anomaly detection algorithms. The first data is added into the annotated sample library as annotated samples. As time goes by, the number of annotated samples accumulated in the annotated sample library is increasing, so that the anomaly detection algorithms based on supervised learning or semi-supervised learning apply the newly added annotated samples for incremental learning or for periodical re-training of the supervised learning models. In this way, the reliabilities of the supervised learning models are improved, thereby the detection accuracy of the anomaly detection algorithms is improved That is, in response to the second detection result being abnormal, abnormal information is displayed. For example, the abnormal information includes an object name "Cell 1", an occurrence time $t_w$, a KPI name "RRC connection establishment success rate", the KPI value $x_w$, etc. corresponding to the abnormal data (i.e. the first data). The user may choose to input the anomaly confirmation information to confirm the anomaly, or input the anomaly cancellation information to cancel the anomaly; or do nothing. In response to the user inputting the anomaly confirmation information, the first data is added into the annotated sample library as the samples annotated as abnormal. In response to the user inputting the anomaly cancellation information, the first data is added into the sample library as the samples annotated as normal.

The embodiment of the present disclosure determines the final detection result based on the detection results of various anomaly detection algorithms and the verification results of the reliability. Since the verification of reliability is performed based on service experience and domain knowledge of experts, the reliability of the detection result is improved.

Another embodiment of the present disclosure provides an anomaly detection apparatus, which includes a processor and a computer-readable storage medium in which instructions are stored. The instructions, in response to being executed by the processor, implement any one of the above-described anomaly detection methods.

Another embodiment of the present disclosure provides a computer-readable storage medium, on which a computer program is stored. The computer program, in response to being executed by a processor, performs the operations of any one of the above-described anomaly detection methods.

Figure 2:
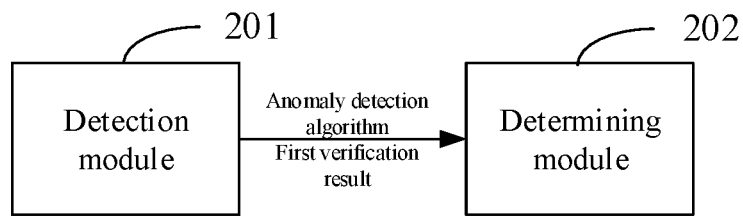
FIG. 2 is a structural composition diagram of an anomaly detection apparatus according to another embodiment of the present disclosure.

Referring to FIG. 2, another embodiment of the present disclosure provides an anomaly detection apparatus, which includes a detection module 201, configured to detect first feature data of collected first data using N anomaly detection algorithms to obtain first detection results corresponding, respectively, to the N anomaly detection algorithms, where N is an integer greater than or equal to 1; and in response to first detection results corresponding to one or more anomaly detection algorithms being abnormal, perform reliability verification on the first feature data of the first data to obtain first verification results; and a determining module 202, configured to determine second detection results according to the first verification results and according to whether reliability of the one or more anomaly detection algorithms is greater than or equal to a first preset threshold.

In the embodiment of the present disclosure, the first data may be any data requiring an anomaly detection, such as KPI data.

For example, for an index of radio resource control (RRC) connection establishment success rate of a cell 1, the first data includes a time series number data1 and related data data2.

Herein, the data1 is denoted as $\{(t_1, x_1), \ldots, (t_w, x_w)\}$, where $t_w$ is a time to perform detection, $x_w$ is a value of a RRC connection establishment success rate corresponding to $t_w$, and a granularity of sampling time is T, that is, $t_w - t_{w-1} = T$. The data2 is denoted as $[x_{eff}, x_{ref}, \text{pre\_res}, \text{obj\_id}, \text{KPI\_id}]$, where $x_{eff}$ is the number of RRC connection establishment requests corresponding to $t_w$, $x_{ref}$ is the number of RRC connection establishment failures, pre_res represents whether there is anomaly at $t_{w-1}$, obj_id is an id of the cell, and KPI_id is an id of a KPI to be detected.

In the embodiments of the present disclosure, after collecting the first data, the detection module 201 may extract all the first feature data required by the N anomaly detection algorithms from the first data at one time. Before detecting the first feature data of the collected first data using each of the anomaly detection algorithms to obtain the first detection result, first feature data required by the current anomaly detection algorithm is selected from the extracted feature data.

Alternatively, before detecting the first feature data of the collected first data using each of the anomaly detection algorithms to obtain the first detection result, the detection module 201 extracts the first feature data required by the current anomaly detection algorithm from the collected first data.

It is certain that not all the first data requires a feature extraction. The first data requiring no feature extraction may be directly used as the first feature data.

In an exemplary example, before extracting the feature data of the first data, the detection module 201 cleans the first data first, and then extracts the feature data from the cleaned first data. It is certain that not all the first data require to be cleaned, but some of the first data may be cleaned, which is not limited in the embodiment of the present disclosure.

For example, for the forgoing data1 and data2, the data1 is cleaned, but the data2 is not cleaned. For example, in response to the data1 having a missing value, methods such as a linear interpolation and a mean value are used to supplement in the missing data.

After cleaning the data1, the first feature data is extracted from cleaned data1. For example, feature statistics (such as a maximum value $x_{max}$, a minimum value $x_{min}$, an average value $x_{mean}$, a median value $x_{median}$, a standard deviation $x_{std}$, etc.), a periodic judgment, a classification feature construction (such as an one-hot coding of $t_w$, including hour, day of the week, etc.), calculation of a year-on-year ratio and month-on-month ratio of $x_w$, of a first-order difference, of a second-order difference and the like are carried out on the cleaned data1.

The data2 is added directly into the first feature data to obtain the final first feature data, which is denoted as feature data=$[f_1, f_2, \ldots, f_n]$.

In the embodiments of the present disclosure, the anomaly detection algorithms may be a statistical-based learning algorithm (such as a 3-sigma, an exponentially weighted moving-average (EWMA), an autoregressive integrated moving average model (ARIMA), etc.), an unsupervised classification algorithm (such as an isolation forest, an one-class support vector machine (SVM), a variational auto-encode, etc.), and a supervised learning algorithm (such as a logical regression, an extreme gradient boosting (XG-Boost), a deep neural network (DNN), etc.). In this embodiment, multiple anomaly detection algorithms are used for anomaly detection, with the aim of detecting all possible abnormal data. For example, for the first feature data extracted from the data1 and the data2 mentioned above, the first detection results obtained by using 3-sigma, EWMA, Holt-Winters and XGBoost algorithms are res1=1, res2=0, res3=0 and res4=1, respectively, where 0 means normal and 1 means abnormal.

In the embodiment of the present disclosure, the user may set a verification condition of the reliability verification, select a reliability evaluation method and set related parameters through an interface, and may also import the verification condition, the reliability evaluation method and the related parameters by writing a configuration file. The specific implementation is not limited in the embodiments of the present disclosure.

In an exemplary example, the detection module 201 is specifically configured to perform the reliability verification on the first feature data of the first data in the following ways: performing at least one of the following on the first feature data of the first data: a data validity check, a safety interval check, a network-wide contribution check, an anomaly persistence check.

The specific rules for performing the reliability verification are given by experts according to service experience and domain knowledge, which may be set by users on a page or imported by a configurable file.

For example, for the first feature data extracted from the data1 and the data2, performing the data validity check on the first feature data is to detect whether the number of RRC connection establishment requests $x_{\mathit{eff}}$ is greater than a second preset threshold $x_{\mathit{eff}\_}$threshold. In response to the number of RRC connection establishment requests being greater than the second preset threshold, the first data is considered to be valid, and the safety interval check is continued on the first feature data. In response to the number of RRC connection establishment requests being less than or equal to the second preset threshold value, the first data is considered to be invalid, then the first data is normal (that is, the first verification results are normal), and the check ends. Herein, $x_{\mathit{eff}\_}$threshold is given by experts according to service experience and domain knowledge, which may be specifically set by users on the page or imported by the configurable file.

Performing the safety interval check on the first feature data is to detect whether the RRC connection establishment success rate $x_w$ is within a safety interval $[x_{min}, x_{max}]$. In response to the RRC connection establishment success rate being within the safety interval, the first data is considered to be normal (that is, the first verification results are normal), and the check ends. In response to the RRC connection establishment success rate being not within the safety interval, the network-wide contribution check is continued on the first feature data. Herein, the safety interval $[x_{min}, x_{max} x]$ is given by experts according to service experience and domain knowledge, which may be specifically set by users on the page or imported by the configurable file.

Performing the network-wide contribution check on the first feature data is to detect whether the number of RRC connection establishment failures $x_{\mathit{ref}}$ is greater than a third preset threshold $x_{\mathit{ref}\_}$threshold. In response to the number of RRC connection establishment failures are greater than the third preset threshold, the first verification results are determined to be abnormal. In response to the number of RRC connection establishment failures are less than or equal to the third preset threshold, the persistence check is continued on the first feature data. Herein, $x_{\mathit{ref}\_}$threshold is given by experts according to service experience and domain knowledge, which may be specifically set by users on the page or imported by the configurable file.

Performing the persistence check on the first feature data is to detect whether check results pre_res in a period before $t_w$ are abnormal, and whether there is a trend of continuous deterioration by determining according to a value of the second-order difference. In response to the check results in the period before $t_w$ being abnormal and there being the trend of deterioration, the first verification results are determined to be abnormal. In response to at least one of the check results in the period before $t_w$ being normal, or there being a trend of improvement, the first verification results are determined to be normal, and the check ends.

In an exemplary example, the determining module 202 is specifically configured to perform any one or more of the following: in response to the reliability of at least one of the one or more anomaly detection algorithms to which the first detection results being abnormal correspond being greater than or equal to the first preset threshold, determining that the second detection results are abnormal; and in response to the reliability of each of the one or more anomaly detection algorithms being less than the first preset threshold, taking the first verification results as the second detection results.

For example, in the above detection of the first feature data extracted from the data1 and the data2, in response to the reliability of the anomaly detection algorithm XGBoost being greater than or equal to the first preset threshold and the reliability of the anomaly detection algorithm 3-sigma is less than the first preset threshold, the second detection results are determined to be abnormal. In response to the reliabilities of the anomaly detection algorithms XGBoost and 3-sigma are less than the first preset threshold, the first verification results are taken as the second detection results.

In an exemplary example, the reliabilities of the anomaly detection algorithms include: a similarity comparison of the anomaly detection algorithms, a statistical check, etc. For example, a coincidence rate of the anomaly detection algorithms.

In another exemplary example, the determining module 202 is further configured to calculate the coincidence rate of each of the anomaly detection algorithms.

In an exemplary example, the determining module 202 is specifically configured to calculate the coincidence rate of each of the anomaly detection algorithms in the following ways: determining a ratio of a first quantity to a second quantity as the coincidence rate; where, the first quantity is a number of pieces of second data, among all second data collected within a preset time, to which third detection results being identical to second verification results corresponds, herein the third detection results are obtained by detecting second feature data of the all second data using each of the anomaly detection algorithms, and the second verification results are obtained by performing reliability verification on the second feature data of the all second data; and the second quantity is a number of pieces of second data, among the all second data collected within the preset time, to which third detection results being abnormal corresponds, herein the third detection results being abnormal are obtained by detecting the second feature data of the all second data using each of the anomaly detection algorithms.

Taking the detection results of the index of RRC connection establishment success rate for all cells in the last month as an example. That is, assuming that there are m samples, among all samples of the index of the RRC connection establishment success rate for all cells in the past month, to which the detection results obtained by using the anomaly detection algorithms correspond are abnormal, and the detection results corresponding to each sample obtained by each anomaly detection algorithm and the verification results obtained by the reliability verification of the collected data are recorded. Based on this, the number of samples $c_i$ to which the detection results of anomaly detection algorithm i being consistent with the verification results correspond is calculated, and the coincidence rate is $c_i/m$.

In another embodiment of the present disclosure, the determining module 202 is further configured to perform one or more of the following: in response to the second detection results being abnormal and anomaly cancellation information from a user having been received, annotating the first data as a normal sample and adding the first data into an annotated sample library; and in response to the second detection results being abnormal and anomaly confirmation information from the user having been received, annotating the collected first data as an abnormal sample and adding the first data to the annotated sample library; where, samples annotated as normal or abnormal in the annotated sample library are configured for training supervised learning models of the anomaly detection algorithms, and the anomaly detection algorithms are configured to detect the first feature data of the first data based on the supervised learning models to obtain the first detection results corresponding, respectively, to the N anomaly detection algorithms. The first data is added into the annotated sample library as annotated samples. As time goes by, the number of annotated samples accumulated in the annotated sample library is increasing, so that the anomaly detection algorithms based on supervised learning or semi-supervised learning apply the newly added annotated samples for incremental learning or for periodical re-training of the supervised learning models. In this way, the reliabilities of the supervised learning models are improved, thereby the detection accuracy of the anomaly detection algorithms is improved.

That is, in response to the second detection result being abnormal, abnormal information is displayed. For example, the abnormal information includes an object name "Cell 1", an occurrence time $t_w$, a KPI name "RRC connection establishment success rate", the KPI value etc. corresponding to the abnormal data (i.e. the first data). The user may choose to input the anomaly confirmation information to confirm the anomaly, or input the anomaly cancellation information to cancel the anomaly; or do nothing. In response to the user inputting the anomaly confirmation information, the first data is added into the annotated sample library as the samples annotated as abnormal. In response to the user inputting the anomaly cancellation information, the first data is added into the sample library as the sample annotated as normal.

The embodiment of the present disclosure determines the final detection result based on the detection results of various anomaly detection algorithms and the verification results of the reliability. Since the verification of reliability is performed based on service experience and domain knowledge of experts, the reliability of the detection result is improved.

Those having ordinary skill in the art shall understand that all or some of the operations in the method disclosed above and the functional modules/units in the system and the apparatus can be implemented as software, firmware, hardware and an appropriate combination thereof. In the hardware implementation, division between functional modules/units mentioned in the above description does not necessarily correspond to division of physical components. For example, one physical component may have multiple functions, or one function or operation may be implemented by several physical components. Some physical components or all physical components may be implemented as software executed by a processor, such as a central processing unit, a digital signal processor, or a microprocessor, or may be implemented as hardware, or may be implemented as an integrated circuit, for example, an application specific integrated circuit. Such software can be distributed on a computer-readable medium, which can include a computer storage medium (or non-transitory medium) and a communication medium (or transitory medium). As well known to those having ordinary skill in the art, the term computer storage medium includes a transitory or non-transitory, removable or irremovable medium implemented in any method or technology applied to storage information (such as a computer-readable instruction, a data structure, a computer program module or other data). The computer storage medium includes, but is not limited to, a random access memory (RAM), a read-only memory (ROM), an electrically erasable programmable read only memory (EEPROM), a flash memory or other memory technology, a compact disc read-only memory (CD-ROM), a digital versatile disc (DVD) or another optical disc memory, a magnetic box, a magnetic tape, a magnetic disc or another magnetic storage apparatus, or any other medium applicable to storing desired information and accessible by a computer. In addition, as is well known to those having ordinary skill in the art, the communication medium usually includes computer-readable instructions, data structures, program modules, or other data in a modulated data signal such as a carrier wave or other transmission mechanisms, and may include any information delivery medium.

Although the implementations disclosed in the embodiments of the present disclosure are as above, the contents described are only the implementations used for the convenience of understanding the embodiments of the present disclosure, and are not intended to limit the embodiments of the present disclosure. Any person skilled in the art to which the embodiments of the present disclosure belong may make any modifications and changes in forms and details of implementations without departing from the spirit and scope disclosed in the embodiments of the present disclosure. However, the patent protection scope of the embodiments of the present disclosure shall still be subject to the scope limited by the appended claims.

What is claimed is:

1. An anomaly detection method, comprising:
    detecting first feature data of collected first data using N anomaly detection algorithms to obtain first detection results corresponding, respectively, to the N anomaly detection algorithms, wherein N is an integer greater than or equal to 1;
    in response to first detection results corresponding to one or more anomaly detection algorithms being abnormal, performing reliability verification on the first feature data of the collected first data to obtain first verification results; and
    determining second detection results according to the first verification results and according to whether reliability of the one or more anomaly detection algorithms is greater than or equal to a first preset threshold;
    wherein the method further comprises one or more of the following:
        in response to the second detection results being abnormal and anomaly cancellation information from a user having been received, annotating the collected first data as a normal sample and adding the collected first data to an annotated sample library; and
        in response to the second detection results being abnormal and anomaly confirmation information from the user having been received, annotating the collected first data as an abnormal sample and adding the collected first data to the annotated sample library;
        wherein, samples annotated as normal or abnormal in the annotated sample library are configured for training supervised learning models of the N anomaly detection algorithms, and the N anomaly detection algorithms are configured to detect the first feature data of the collected first data based on the supervised learning models to obtain the first detection results corresponding, respectively, to the N anomaly detection algorithms.

2. The method according to claim 1, wherein performing the reliability verification on the first feature data of the collected first data comprises:
    performing at least one of the following on the first feature data of the collected first data:

a data validity check, a safety interval check, a network-wide contribution check, an anomaly persistence check.

3. The method according to claim 1, wherein determining the second detection results according to the first verification results and according to whether the reliability of the one or more anomaly detection algorithms is greater than or equal to the first preset threshold comprises one or more of the following:
in response to the reliability of at least one of the one or more anomaly detection algorithms being greater than or equal to the first preset threshold, determining that the second detection results are abnormal; and
in response to the reliability of each of the one or more anomaly detection algorithms being less than the first preset threshold, taking the first verification results as the second detection results.

4. The method according to claim 1, wherein the reliability of each of the N anomaly detection algorithms comprises a coincidence rate of each of the N anomaly detection algorithms.

5. The method according to claim 4, wherein before determining
the second detection results according to the first verification results and according to whether the reliability of the one or more anomaly detection algorithms is greater than or equal to the first preset threshold, the method further comprises:
calculating the coincidence rate of each of the N anomaly detection algorithms.

6. The method according to claim 5, wherein calculating the
coincidence rate of each of the N anomaly detection algorithms comprises:
determining a ratio of a first quantity to a second quantity as the coincidence rate;
wherein, the first quantity is a number of pieces of second data, among all second data collected within a preset time, to which third detection results being identical to second verification results correspond, wherein the third detection results are obtained by detecting second feature data of the all second data using each of the N anomaly detection algorithms, and the second verification results are obtained by performing reliability verification on the second feature data of the all second data; and
the second quantity is a number of pieces of second data, among the all second data collected within the preset time, to which third detection results being abnormal correspond, wherein the third detection results being abnormal are obtained by detecting the second feature data of the all second data using each of the N anomaly detection algorithms.

7. An anomaly detection apparatus comprising a
processor and a computer-readable storage medium in which instructions are stored, wherein the instructions, in response to being executed by the processor, implement the anomaly detection method comprising:
detecting first feature data of collected first data using N anomaly detection algorithms to obtain first detection results corresponding, respectively, to the N anomaly detection algorithms, wherein N is an integer greater than or equal to I;
in response to first detection results corresponding to one or more anomaly detection algorithms being abnormal, performing reliability verification on the first feature data of the collected first data to obtain first verification results; and
determining second detection results according to the first verification results and according to whether reliability of the one or more anomaly detection algorithms is greater than or equal to a first preset threshold;
wherein the method further comprises one or more of the following:
in response to the second detection results being abnormal and anomaly cancellation information from a user having been received, annotating the collected first data as a normal sample and adding the collected first data to an annotated sample library; and
in response to the second detection results being abnormal and anomaly confirmation information from the user having been received, annotating the collected first data as an abnormal sample and adding the collected first data to the annotated sample library;
wherein, samples annotated as normal or abnormal in the annotated sample library are configured for training supervised learning models of the N anomaly detection algorithms, and the N anomaly detection algorithms are configured to detect the first feature data of the collected first data based on the supervised learning models to obtain the first detection results corresponding, respectively, to the N anomaly detection algorithms.

8. A non-transitory computer-readable storage medium on which a computer program is stored, wherein the computer program, in response to being executed by a processor, performs the operations of an anomaly detection method comprising:
detecting first feature data of collected first data using N anomaly detection algorithms to obtain first detection results corresponding, respectively, to the N anomaly detection algorithms, wherein N is an integer greater than or equal to 1;
in response to first detection results corresponding to one or more anomaly detection algorithms being abnormal, performing reliability verification on the first feature data of the collected first data to obtain first verification results; and
determining second detection results according to the first verification results and according to whether reliability of the one or more anomaly detection algorithms is greater than or equal to a first preset threshold;
wherein the method further comprises one or more of the following:
in response to the second detection results being abnormal and anomaly cancellation information from a user having been received, annotating the collected first data as a normal sample and adding the collected first data to an annotated sample library; and
in response to the second detection results being abnormal and anomaly confirmation information from the user having been received, annotating the collected first data as an abnormal sample and adding the collected first data to the annotated sample library;
wherein, samples annotated as normal or abnormal in the annotated sample library are configured for training supervised learning models of the N anomaly detection algorithms, and the N anomaly detection algorithms are configured to detect the first feature data of the collected first data based on the supervised learning models to obtain the first detection results corresponding, respectively, to the N anomaly detection algorithms.

9. The anomaly detection apparatus according to claim 7, wherein performing the reliability verification on the first feature data of the collected first data comprises:
performing at least one of the following on the first feature data of the collected first data:
a data validity check, a safety interval check, a network-wide contribution check, an anomaly persistence check.

10. The anomaly detection apparatus according to claim 7, wherein determining the second detection results according to the first verification results and according to whether the reliability of the one or more anomaly detection algorithms is greater than or equal to the first preset threshold comprises one or more of the following:
in response to the reliability of at least one of the one or more anomaly detection algorithms being greater than or equal to the first preset threshold, determining that the second detection results are abnormal; and
in response to the reliability of each of the one or more anomaly detection algorithms being less than the first preset threshold, taking the first verification results as the second detection results.

11. The anomaly detection apparatus according to claim 7, wherein the reliability of each of the N anomaly detection algorithms comprises a coincidence rate of each of the N anomaly detection algorithms; and
wherein before determining the second detection results according to the first verification results and according to whether the reliability of the one or more anomaly detection algorithms is greater than or equal to the first preset threshold, the method further comprises:
calculating the coincidence rate of each of the N anomaly detection algorithms.

12. The anomaly detection apparatus according to claim 11, wherein calculating the coincidence rate of each of the N anomaly detection algorithms comprises:
determining a ratio of a first quantity to a second quantity as the coincidence rate; wherein, the first quantity is a number of pieces of second data, among all second data collected within a preset time, to which third detection results being identical to second verification results correspond, wherein the third detection results are obtained by detecting second feature data of the all second data using each of the N anomaly detection algorithms, and the second verification results are obtained by performing reliability verification on the second feature data of the all second data; and
the second quantity is a number of pieces of second data, among the all second data collected within the preset time, to which third detection results being abnormal correspond, wherein the third detection results being abnormal are obtained by detecting the second feature data of the all second data using each of the N anomaly detection algorithms.

13. The non-transitory computer-readable storage medium according to claim 8, wherein performing the reliability verification on the first feature data of the collected first data comprises: performing at least one of the following on the first feature data of the collected first data:
a data validity check, a safety interval check, a network-wide contribution check, an anomaly persistence check.

14. The non-transitory computer-readable storage medium according to claim 8, wherein determining the second detection results according to the first verification results and according to whether the reliability of the one or more anomaly detection algorithms is greater than or equal to the first preset threshold comprises one or more of the following:
in response to the reliability of at least one of the one or more anomaly detection algorithms being greater than or equal to the first preset threshold, determining that the second detection results are abnormal; and
in response to the reliability of each of the one or more anomaly detection algorithms being less than the first preset threshold, taking the first verification results as the second detection results.

15. The non-transitory computer-readable storage medium according to claim 8, wherein the reliability of each of the N anomaly detection algorithms comprises a coincidence rate of each of the N anomaly detection algorithms.

16. The non-transitory computer-readable storage medium according to claim 15, wherein before determining the second detection results according to the first verification results and according to whether the reliability of the one or more anomaly detection algorithms is greater than or equal to the first preset threshold, the method further comprises:
calculating the coincidence rate of each of the N anomaly detection algorithms.

17. The non-transitory computer-readable storage medium according to claim 16, wherein calculating the coincidence rate of each of the N anomaly detection algorithms comprises:
determining a ratio of a first quantity to a second quantity as the coincidence rate;
wherein, the first quantity is a number of pieces of second data, among all second data collected within a preset time, to which third detection results being identical to second verification results correspond, wherein the third detection results are obtained by detecting second feature data of the all second data using each of the N anomaly detection algorithms, and the second verification results are obtained by performing reliability verification on the second feature data of the all second data; and
the second quantity is a number of pieces of second data, among the all second data collected within the preset time, to which third detection results being abnormal correspond, wherein the third detection results being abnormal are obtained by detecting the second feature data of the all second data using each of the N anomaly detection algorithms.

* * * * *

UNITED STATES PATENT AND TRADEMARK OFFICE
CERTIFICATE OF CORRECTION

PATENT NO. : 11,777,824 B2
APPLICATION NO. : 17/625078
DATED : October 3, 2023
INVENTOR(S) : Yongsheng Du, Yingyan Luo and Chunjin Pan It is certified that error appears in the above-identified patent and that said Letters Patent is hereby corrected as shown below:

In the Claims

Column 13, Claim 7, Line 65: "than or equal to I;" should be "than or equal to 1".

Signed and Sealed this
Nineteenth Day of March, 2024

Katherine Kelly Vidal
*Director of the United States Patent and Trademark Office*